March 21, 1967    M. RANDALL    3,310,159
APPARATUS FOR PREVENTING THE OVERTURNING
OF CONVEYOR-CARRIED OBJECTS
Filed July 14, 1965
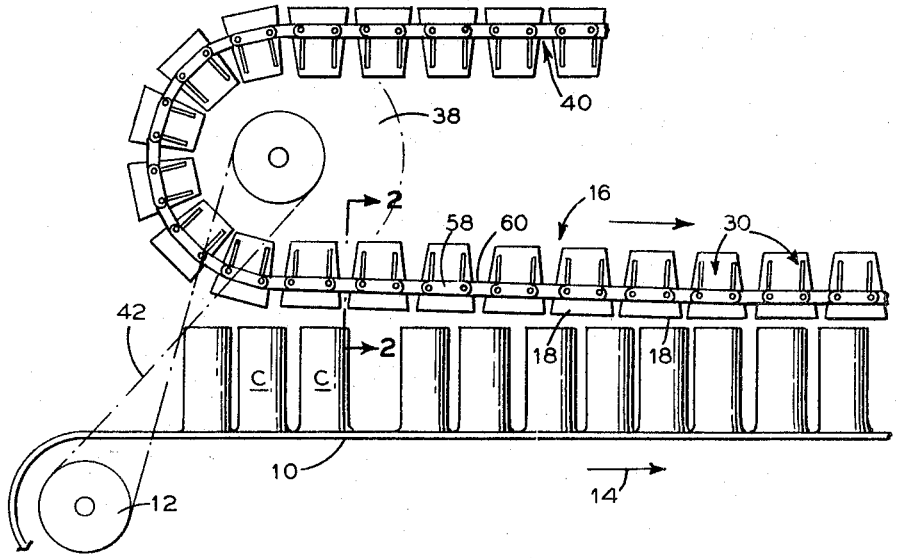
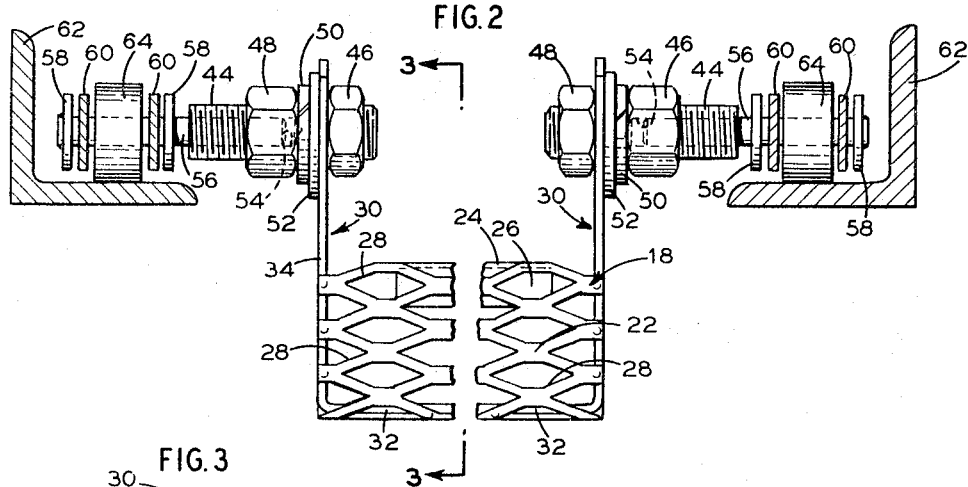
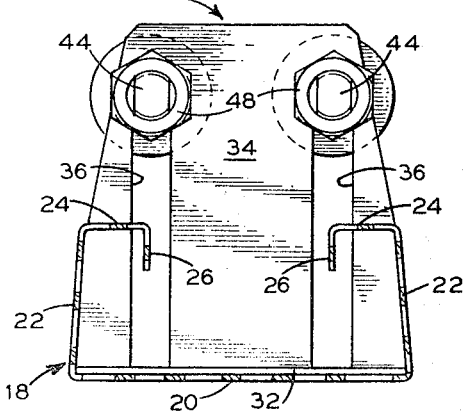
INVENTOR.
Max Randall
BY
*Irving Seidman*
ATTORNEY

3,310,159
APPARATUS FOR PREVENTING THE OVERTURN-
ING OF CONVEYOR-CARRIED OBJECTS
Max Randall, 525 Longview Road,
South Orange, N.J. 07079
Filed July 14, 1965, Ser. No. 471,889
6 Claims. (Cl. 198—162)

This invention relates generally to an apparatus for preventing the overturning of objects being transported by a conveyor and more particularly, to a device for maintaining objects on a moving conveyor upright without gripping the particular objects.

The manufacture of most metal products and, in particular, the manufacture of metal cans includes a cleaning process wherein the interior and exterior surfaces of the objects are subjected to the alternating application of high pressure cleaning fluid sprays and high velocity air nozzles as the objects are transported through the stages of a cleaning machine by a conveyor belt. As the last step in the cleaning process, the objects or, in the example under consideration, the cans are subjected to the application of heated recirculated air in a drying stage which removes all traces of moisture from the cans. During the stages of this cleaning process it is imperative that the cans remain oriented in a particular position because the fluid dispensing nozzles in the cleaning machine direct the fluid issuing therefrom at the cans at predetermined angles to insure maximum effectiveness. For example, if a can did not have the desired orientation as it progressed through the cleaning machine, the cleaning fluid might never reach the interior surfaces of the can. Additionally, an overturned can might very well jam the operating mechanism.

Accordingly, various devices have been proposed and utilized in the past to maintain the cans upright during their movement through the cleaning machine. These devices normally comprised some type of gripping mechanism which engaged the lower or upper portion of the cans during their movement through the cleaning stages in the cleaning machine. However, it was found that these devices actually damaged the cans. Additionally, some types of gripping devices covered portions of the cans so that the cleaning fluid never reached these masked portions.

Thus, a desideratum of the present invention is to provide a device which maintains cans or similar objects in a desired position on a moving conveyor system without gripping the cans.

Another object of the present invention is to provide a device for preventing the overturning of cans being transported on a conveyor through spraying stages which does not block the spray issuing from the spray heads or nozzles.

A further object of the present invention is to provide an apparatus of the type described which is easily adjustable to accommodate objects having varying heights.

A preferred embodiment of the present invention comprises a plurality of members each one of which is provided wthi a bottom wall. The members are connected together in an endless loop having an upper and a lower portion. The loop is mounted above a moving conveyor system which carries the objects or cans thereon. The bottom walls of the respective members comprising the lower portion of the loop are positioned parallel to the upper surface of the conveyor and in spaced relation to the top surface of the cans. The spacing between the cans and the respective bottom walls is such that the walls will engage the top surface of a can when the can tilts to prevent the overturning thereof. Additionally, drive means is provided for moving the members in the lower portion of the loop in the same direction and at the same speed as that of the conveyor to thereby eliminate the possibility of the overturning of a can due to the relative motion of the conveyor and the members.

It is a feature of the present invention to provide an apparatus for preventing the overturning of cans being transported by a conveyor wherein the apparatus is normally spaced from the top surface of the cans.

The above and other objects and advantages of the present invention will become more apparent from a consideration of the following detailed description when taken in conjunction with the accompanying drawings, in which:

FIG. 1 is a front elevation, with parts broken away, of an apparatus constructed according to the invention in conjunction with a conveyor system;

FIG. 2 is a partial sectional view, to an enlarged scale, of a portion of the apparatus illustrated in FIG. 1; and FIG. 3 is a cross-section taken along line 3—3 in FIG. 2.

The apparatus of the present invention is adapted to be utilized in conjunction with a conveyor belt or conveyor 10, as shown in FIG. 1. The conveyor belt 10 is conventional and comprises an endless loop which is received about similar sprockets or shafts 12 positioned at each end of the loop. One of the shafts 12 is rotated by a motor (not shown) in the conventional manner to impart a similar movement to the belt 10, by positive engagement therewith, in the direction indicated by the arrow 14. A plurality of cans C are mounted on the upper surface of the conveyor belt 10 in an upright position. It is to be understood that the conveyor belt 10 carries the cans C through a cleaning machine (not shown) wherein the cans are subjected to a high pressure cleaning fluid which cleanses the cans. As noted above, it is essential to the cleaning operation that the cans remain upright throughout their travel through the machine. However, it is emphasized that the present invention is not limited for use solely in conjunction with a can cleaning device but it may be utilized to maintain any object which is being transported on a conveyor in a preselected orientation.

The apparatus of the present invention is positioned in spaced relation to the top surfaces of the cans C and is designated generally by the numeral 16 in FIG. 1. The apparatus 16 comprises a plurality of channel-shaped metal members 18 which are connected together to form an endless loop or chain. More particularly, as shown in FIG. 3, each one of the plurality of members 18 is provided with a substantially flat bottom wall 20 and upstanding side walls 22. Each one of the side walls 22 terminates in an inturn lip 24 which is provided with a depending flange 26. The lips 24 and the associated flanges 26 terminate inwardly of the respective front and rear edges of the member 18 (FIG. 2). A plurality of holes 28 are provided through the members 18 to allow for the passage of a fluid therethrough.

The metal members 18 may be pre-stressed and given a very slight reverse camber during their fabrication to provide elements that have substantially zero deflection over their entire length. Additionally, each member 18 is channel-shaped in cross-section to provide a rigid element with a relatively high strength to weight ratio.

Each one of the plurality of the members 18 is supported by a different pair of brackets 30. Each bracket 30 comprises a transversely extending bottom wall 32 and an integral upstanding wall 34, the upper portion of which tapers upwardly inwardly. Provided in the wall 34 are a pair of spaced vertically extending slots 36. The bottom walls 32 of a pair of brackets 30 which support a particular member 18 are connected to the bottom wall 20 of the member and the edges of the respective upstanding walls 34 of each one of the pair of brackets are connected to the side walls 22 adjacent the respective front and rear edges of the member 18. The upper portion of each of the brackets extends above the lips 24. The brackets 30 and the member 18 may be connected together in any conventional manner, as by tack welding the elements. As shown in FIG. 2, the bottom walls 32 of the pair of brackets 30 extend toward each other but terminate a substantial distance short of one another. Moreover, the slots 36 in opposed brackets 30 are aligned.

Each one of the aligned slots 36 in each pair of opposed brackets 30 receives a threaded shaft or stud 44 therethrough. The shafts 44 are affixed in place by the respective nuts 46 and 48 which are threaded to the shafts on each side of the wall 34 so that aligned shafts 44 project laterally from the walls 34 of each pair of supporting brackets 30 in opposed directions. The lock washer 50 and the washers 52 may be provided intermediate the walls 34 and the nuts 46. Provided in the outer end of each of the shafts 44 is an axial bore 54.

Similar longitudinally spaced sprockets or shafts 38, only one of which is shown in FIG. 1, are rotatably mounted above the conveyor 10 by appropriate means (not shown). The ends of a pair of transversely spaced endless roller-chains 40 encircle the shafts 38 and are in driving engagement therewith, in the conventional manner. In the preferred embodiment the roller-chains 40 are precision matched and paired chains with oversized rollers and each chain comprises an upper and a lower run. A set of spur gears or a twisted belt 42 interconnects the shafts 12 and 38 to rotate the shaft 38 so that the lower runs of the chains 40 are driven in the same direction and at the same speed as that of the conveyor 10.

A plurality of pins 56 are provided to interconnect the adjacent links comprising the roller chain 40 and to engage the shafts 44 to connect the members 18 to the pair of roller chains. More specifically, as shown in FIG. 2, the pins 56 extend through a central aperture in the rollers 64. The pair of links 58 are rotatably mounted on each of the pins 56 on each side of the rollers 64 and the links 60 are similarly rotatably received on the pins 56 between the roller 64 and a respective link 58. The heads of the pins 56 are swaged to prevent the links from falling off the pins. It is to be noted that each pin 56 in one of the roller chains 40 is aligned with a similar pin in the other roller chain 40 and the spacing between the pins extending through the ends of a link is substantially the same as the spacing between the slots 36 and therefore the shafts 44. Thus, the aligned pins 56 extend beyond the respective chains 40 toward each other and are slidably received in the bores 54 in aligned ones of the shafts 44 to connect the roller chains 40 to the member 18. It is to be noted that there is slight transverse movement between the pins 56 and the associated shaft 44.

The opposed tracks 62 are mounted above and parallel to the upper surface of the conveyor 10 and each track is positioned to support the respective lower run of each of the roller-chains 40. Hence, the tracks 62 insure that the lower runs of the roller-chains 40 will be maintained at a preselected level with respect to the upper surface of the conveyor 10.

In operation, the nuts 48 are loosened and the pair of brackets 30 which support a member 18 connected between the lower runs of the chains 40 are moved either upwardly or downwardly relative to the associated shafts 44 until the bottom wall 20 of the member 18 is substantially parallel to the upper surface of the conveyor 10 and spaced above the top surface of the cans C by approximately one-eighth of an inch. The respective nuts 48 are then tightened against the respective lock washers 50. This procedure is repeated for each one of the plurality of members 18 so that the bottom walls 20 of each of these members connected between the lower runs of the chains at any one instant are substantially coplanar. Since the lower runs of the chains 40 are driven in the same direction and at the same speed as that of the conveyor 10, the members 18 will have the same motion. Thus, the possibility of a jam-up is eliminated because there is no relative motion between the members 18 and the conveyor 10.

Accordingly, if one or more of the cans C begin to tilt, the bottom wall 20 of the member 18 spaced above the tilting can will engage the upper surface of that can to prevent the overturning thereof.

Thus, it is seen that a device has been provided for maintaining cans or similar articles which are being transported by a conveyor in an upright position without gripping the cans or blocking any fluids sprayed onto the cans.

While a preferred embodiment of the invention has been shown and described, it will be obvious that numerous additions, changes and omissions may be made in such embodiment without departing from the spirit and scope of the invention.

What is claimed is:

1. In combination, a moving conveyor, and an apparatus for maintaining upright cans being transported on said moving conveyor, said apparatus comprising a plurality of channel-shaped members, each of said plurality of channel-shaped members having a flat bottom wall, endless roller chain means supported above said conveyor and having upper and lower runs, a plurality of bracket means, a different pair of said bracket means connecting respective ones of said plurality of members to said chain means, and slot means in said bracket means cooperable with said chain means for adjustably vertical positioning said bracket means with respect to said chain means, whereby the bottom walls of those members connected to the lower run of said chain means are substantially parallel to the upper surface of the conveyor and in spaced relation to the top surface of the cans, the spacing between the cans and the bottom walls of the plurality of members connected to lower run of the chain means being such that the bottom wall is adapted to abut the upper surface of the cans when they tilt to prevent overturning thereof.

2. Apparatus as in claim 1, wherein the bottom walls are each provided with a plurality of holes to provide for the passage of a fluid therethrough.

3. Apparatus as in claim 1, and drive means connected to said chain means for driving those members connected to the lower run of the chain means in the same direction and at the same speed as that of said moving conveyor.

4. In combination, moving conveyor, and apparatus for maintaining upright cans being transported by said moving conveyor, said apparatus comprising a plurality of channel-shaped members, each of said plurality of channel-shaped members having a flat bottom wall, a pair of endless roller chains positioned above the conveyor and having upper and lower runs, a different pair of bracket means connected to each of said plurality of members, each of said bracket means having an elongated slot therein, mounting means connected to each of said pair of chains and engageable in the elongated slots of respective ones of each of said pair of bracket means for mounting said plurality of members between said pair of chains so that each one of said plurality of members is individually vertically adjustable with respect thereto, whereby the bottom walls of the members connected to the lower runs of said pair of chains is substantially parallel to the upper surface of the conveyor and in spaced relation to the upper surface of the cans, the spacing between the cans and the bottom wall of the members connected to the lower runs of the pair of chains being such that the bottom walls are adapted to abut the upper surface of the cans when they tilt to prevent the overturning thereof.

5. Apparaus as in claim 4, and track means positioned above said conveyor for supporting the lower runs of said pair of chains thereon.

6. Apparatus as in claim 4, and drive means connected to said pair of roller chains for driving the members connected to the lower runs of said chains in the same direction and at the same speed as that of said conveyor.

References Cited by the Examiner

UNITED STATES PATENTS

| | | | |
|---|---|---|---|
| 2,331,164 | 10/1943 | Berger | 134—127 |
| 2,996,169 | 8/1961 | Gentry | 198—162 |
| 3,142,374 | 7/1964 | Carter | 198—165 |

EVON C. BLUNK, *Primary Examiner.*

RICHARD E. AEGERTER, *Examiner.*